United States Patent [19]

Eden et al.

[11] 4,134,862

[45] Jan. 16, 1979

[54] METHOD FOR STABILIZING SOIL AND FOR PROVIDING A BACKFILL FOR GROUNDING MEMBERS

[75] Inventors: Donald A. Eden, Mercer Island; William H. Griffin, Bellevue, both of Wash.

[73] Assignee: Construction Aids Technology, Inc., Mercer Island, Wash.

[21] Appl. No.: 806,445

[22] Filed: Jun. 14, 1977

[51] Int. Cl.$^2$ .............................................. C08L 3/02
[52] U.S. Cl. ................................. 260/17.4 GC; 47/9; 47/DIG. 10; 204/147; 204/196; 260/DIG. 14; 405/264
[58] Field of Search ............... 260/17.4 GC, DIG. 14; 204/196, 147; 61/36 C

[56] References Cited

U.S. PATENT DOCUMENTS

| | | | |
|---|---|---|---|
| 2,553,654 | 5/1951 | Heise | 204/196 |
| 3,370,935 | 2/1968 | Adams et al. | 260/17.4 GB |
| 3,661,815 | 5/1972 | Smith | 260/17.4 |
| 3,935,099 | 1/1976 | Weaver et al. | 260/17.4 |
| 3,981,100 | 9/1976 | Weaver et al. | 47/58 |
| 3,997,484 | 12/1976 | Weaver et al. | 260/17.4 |
| 4,045,387 | 8/1977 | Fanta et al. | 47/DIG. 10 |
| 4,051,086 | 9/1977 | Reid | 260/17.4 GC |
| 4,051,630 | 10/1977 | Bishop | 47/DIG. 10 |

OTHER PUBLICATIONS

"Mopping up with 'Super Slurper'", Business Week, Sep. 7, 1974, p. 78.
"Super Slurper in top-100 List of New 75 Products", Des Moines Sun Register, Sep. 21, 1973, p. 2/F.
"Super Slurper-Compound with a Super Thirst", Agricultural Research, Jun. 1975, pp. 7-9.
"Cathodic Protection Fundamentals,", Lehmann, Joseph A., Feb. 1974.
"Lime Dries Up Mud", Paper Produced by the National Lime Assoc.
Chem. Abs. vol. 77: 115628t, "Acrylamide Polymer Used For Earth Grounding in Electrical Installations," Nitto Chem. Ind. Co.
Chem. Abs. vol. 78: "Compositions for Rapidly Consolidating Wet Earth", Hochbach, 14973s.

Primary Examiner—Edward M. Woodberry
Attorney, Agent, or Firm—Christensen, O'Connor, Johnson & Kindness

[57] ABSTRACT

Wet soil containing up to about 40% by wet weight of water is stabilized into a relatively dry, compactable soil mass for use as backfill in excavations by admixing lime and an alkali metal salt of a starch-polyacrylonitrile or starch-polymethacrylonitrile graft copolymer with the soil, allowing the resulting admixture to stand for a short period of time to produce a relatively dry, compactable soil mass, and thereafter using the soil mass as backfill. The aforementioned graft copolymer can also be used as backfill around electrically conductive, grounding members by combining the graft copolymer with a binder or relatively water impervious material, such as a bentonite clay, and interposing the clay/graft copolymer mixture between the grounding member and the surrounding soil.

36 Claims, 2 Drawing Figures

METHOD FOR STABILIZING SOIL AND FOR PROVIDING A BACKFILL FOR GROUNDING MEMBERS

BACKGROUND OF THE INVENTION

In one aspect, the present invention relates to backfills for use in areas where excavations are made in wet soil conditions and where the excavated soil is unsuitable for returning to the excavation. In another aspect, the present invention relates to backfill material for surrounding grounding members to increase their long term efficiency and increase their ability to transmit a current to the ground. More particularly, the present invention relates in its first aspect to a method for stabilizing wet soil that is incapable of being readily compacted, generally referred to as over-optimum soil, to yield a relatively dry, compactable soil mass for returning to an excavation from which the wet soil was removed. Furthermore, the present invention relates in its second aspect to a method and composition for providing a fill material for surrounding grounding members, such as an anode of a cathodic protection system.

Wet soil, containing on the order of 10% to 40% by weight of water, based on the wet soil, is generally unsuitable for backfilling into an excavation from which it has been taken because it will not readily compact to a degree sufficient to support a load. Depending upon the type of soil, soil containing less than 10% water may also be unsuitable for backfill. Moreover, wet soil, because it will not compact, tends to settle over a period of time after it has been replaced in an excavation, thus causing a ground depression at the location of the excavation. Conventionally, this compactability problem is solved by removing the wet soil from the excavation location and by transporting to the excavation location a dry, compactable backfill such as a relatively dry sand or other soil composition. Although this method of backfilling excavation works well, it can be expensive and time consuming, especially when the transportation costs of the replacement backfill are taken into consideration.

When no replacement backfill is available or when it is extremely expensive to transport dry, compactable backfill to the excavation location, drying agents have been employed in an attempt to sufficiently reduce the apparent water content of the soil so that the soil can be replaced in the excavation from which it was taken and compacted to a degree that will support a load and will not settle to any significant degree with time. One such drying agent is lime. Lime has been employed as a drying agent in both quicklime and hydrated form. Although quicklime has a greater affinity for water, it is normally not used as a drying agent because of its caustic nature. When the soil to be dried is relatively wet, on the order of 25% or more water, hydrated must be used in large quantities to achieve a sufficient degree of dryness within a short period of time for the soil to be compacted. Such large quantities of lime are expensive and create secondary problems. When such large quantities of lime are used, the soil/lime mass becomes very dusty and difficult to handle, the dusty material is somewhat hazardous to the laborers handling the backfill, and the resulting soil mass tends to dry out and crack with time and furthermore becomes so hard that it cannot be easily worked. Thus, combining large quantities of lime with the soil has been an unsatisfactory solution for rapid stabilization.

The amount of lime required to dry out the soil can be reduced by using quicklime. However, as previously pointed out, quicklime is extremely caustic and thus difficult to handle, especially where medium to large quantities are required. Furthermore, large quantities of quicklime are required to achieve rapid drying of the soil, compounding the problems associated with handling and safety. Also, when large quantities of lime are used, excessive amounts of undesirable heat are generated in the hydration process. The soil mass resulting from the use of large quantities of lime can become quite hard after compaction, resulting in an overload on a pipe on which the backfill is placed and resulting in a soil mass that is difficult to reexcavate.

Accordingly, it is a broad object of the present invention to provide a soil additive for stabilizing wet soil, that is, to produce a relatively dry, compactable soil mass for use as a backfill. Further objects of the present invention are to eliminate the need to transport replacement backfill to the location of an excavation and thus reduce the manual labor and expense required in replacing wet backfill; to eliminate the dust problem by reducing the amount of additive required to dry out the soil; and to provide methods and compositions that are easily handled by laborers normally replacing the backfill and that do not require any substantial learning curve to handle readily and efficiently.

SUMMARY OF THE INVENTION

The foregoing objects, and others that will become apparent to one of ordinary skill as he reads the following specification, are provided in a method for stabilizing water-containing soil to form a relatively dry, compactable soil mass. The method includes the step of combining an alkali metal salt of a starch-polyacrylonitrile or a starch-polymethacrylonitrile graft copolymer and a hydratable material with water-containing soil. The graft copolymer and the hydratable material are combined with the soil in an amount effective to remove water from the soil by absorption of at least a portion of the water in the soil by the graft copolymer and by at least partially hydrating the hydratable material. The amount of graft copolymer and hydratable material must also be effective to form a relatively dry, compactable soil mass.

In order to obtain a relatively dry, compactable soil mass, it is crtical when lime is employed as the hydratable material that lime be present in the form of quicklime and be present in amounts in the range of from about 50 pounds to about 400 pounds per cubic yard of unstabilized soil and that the graft copolymer be present in an amount from about 0.25 pounds to about 4 pounds per cubic yard of soil. It is preferred that the proportion of graft copolymer to lime be less than about 3:100 by weight for soil containing about 10% by weight of water, based on the wet weight of the soil, to less than about 2:100 by weight for soil containing about 40% by weight of water, based on the wet weight of the soil. It is also preferred that the proportion of graft copolymer to lime be greater than about 1:100 by weight.

As an adjunct to and as a completely unexpected ancillary benefit to the foregoing discovery, it has further been discovered that an alkali metal salt of a starch-polyacrylonitrile graft copolymer or a starch-polymethacrylonitrile graft copolymer provides an excellent backfill for electrically conductive grounding members such as the anodes of a cathodic protection system. The graft copolymer, in combination with a suitable binder, is placed around an anode, preferably in a cavity or excavation prepared for the anode that is somewhat larger than the anode. This grounding member backfill yields a much higher current flow than is obtainable from prior art grounding type backfill materials and maintains that high degree of conductivity for a relatively long period when compared to prior art materials. A preferred grounding member composition comprises a 1:1 weight ratio of the graft copolymer and a bentonite clay combined with water in a weight ratio range of from about 20:1 to about 40:1 or greater, water to the combined amount of graft copolymer and bentonite. This preferred mixture is poured in the excess portion of volume of the cavity in which the anode is placed and then the entire mixture and anode can be covered over with conventional backfill material.

BRIEF DESCRIPTION OF THE DRAWINGS

A better understanding of the present invention can be derived by reading the ensuing specification in conjunction with the accompanying drawings, wherein.

DETAILED DESCRIPTION OF THE INVENTION

Generally, all kinds of soils are encountered in construction repair projects throughout the country. These soils include clay, slit, sand, gravel, and an almost infinite variety of mixtures of those four basic kinds of soils. Almost invariably, these soils are water-containing soils, that is, they comprise some proportion of water, whether it be free or absorbed or bonded in some manner to the soil components or impurities in the soil components. Generally, the water content of soil is measured on the basis of wet weight percentage, that is, the percentage of water in the soil based on the total weight of water and soil. As pointed out above, water-containing soil removed from an excavation oftentimes is not reusable for filling that excavation because the loosening of the soil particles during excavation in conjunction with the water in the soil prevents it from being compacted when returned to the excavation. The backfill is normally placed in the excavation only up to the surrounding ground level. This, however, as pointed out above, causes additional problems from settling of the backfill with time. This condition is also intolerable, especially where the roadway must be resurfaced over the excavation, as settling in time will cause a depression in the roadway that is unacceptable to those charged with roadway maintenance. The present invention solves the foregoing problems and those additional problems pointed out in the background of the invention by providing a stabilizing agent for the soil removed from an excavation that will effectively dry out the soil so that it can be returned to the excavation, compacted to a level adjacent the surrounding ground level and remain in compacted form without any substantial settling.

In accordance with the present invention, an alkali metal salt of a starch-polyacrylonitrile or a starch-polymethacrylonitrile graft copolymer and a hydratable material are admixed with the water-containing soil either as it is removed from the excavation or after it is removed from the excavation. The graft copolymer and hydratable material is preferably mixed with the soil in the appropriate proportions as outlined below as the soil is removed from the excavation. The graft copolymer and hydratable material can be premixed and then combined with the soil, or can be individually mixed with the soil at the excavation site. The admixing can be accomplished by hand with a shovel or by a portable mixer. The use of a portable mixer, however, is not at all necessary to achieve the desired result of a relatively dry, compactable soil mass that can be returned to the excavation and compacted to a level adjacent the ground level surrounding the excavation. If the excavation is in a location where resurfacing is to be redone over the backfilled excavation, the resurfacing can be initiated immediately after the backfill is compacted in the excavation without any adverse results stemming from use of the additive.

The graft copolymer usable with the present invention is preferably produced by saponifying a starch-polyacrylonitrile graft copolymer, wherein the molar ratio of acrylonitrile to starch is at least 2:1, or a starch-polymethacrylonitrile graft copolymer, wherein the molar ratio of methacrylonitrile to starch is at least 2:1, with an aqueous methanolic or aqueous ethanolic solution of an alkali base. The preferred alkali base can be selected from the group consisting of sodium hydroxide, lithium hydroxide, or potassium hydroxide. Additional information relating to the manufacture of this graft copolymer is set forth in U.S. Pat. No. 3,661,815, issued May 9, 1972 to Theodore Smith and assigned to Grain Processing Corporation, Muscatine, Iowa. For the sake of brevity in this specification, additional details on the manufacture and processing techniques of the preferred graft copolymer will not be set forth herein; instead, U.S. Pat. No. 3,661,815 is hereby expressly incorporated by reference.

A second, closely related graft copolymer can also be employed in accordance with the present invention. That graft copolymer is produced by saponifying a gelatinized starch-polyacrylonitrile graft copolymer or a gelatinized starch-polymethacrylonitrile graft copolymer in an aqueous solution. The manufacture and processing details of this graft copolymer are disclosed in U.S. Pat. No. 3,935,009, issued Jan. 27, 1976 to Weaver et al., U.S. Pat. No. 3,981,100, issued Sept. 21, 1976 to Weaver et al., and U.S. Pat. No. 3,997,484, issued Dec. 14, 1976 to Weaver et al., all of which are assigned to the United States of America as represented by the Secretary of Agriculture and all of which are expressly incorporated herein by reference. Again, the foregoing three patents have been incorporated by reference for the sake of brevity of the present specification.

Of the two classes of polymer just described, the polymer produced by the process of U.S. Pat. No. 3,661,815 to Grain Processing is preferred over the other polymers, as the latter polymers are very sensitive to the inorganic salt content of the soil. The level of salts normally encountered in the soil will reduce the latter polymers' capability to absorb water to well below that of the polymer produced in accordance with the Grain Processing patent, while the water absorption capability of the Grain Processing polymer is not significantly affected by the same levels of inorganic salt in the soil.

Although it is believed that any hydratable material will work within the broad purview of the present invention, preferred hydratable materials are those which are inexpensive and which in their anhydrous form have a great affinity for and ready reactivity with water. Amoung the hydratable materials that are operable in the present invention are rapidly curing cement (normally referred to as high early cement), other cement compositions, and fly ash in combination with a cement. These other materials, however, do have a common drawback when compared with quicklime because they do not have as great an affinity for water as does quicklime. Consequently, significantly larger quantities of cement, for example, must be used than are required when quicklime is employed as the hydratable material. Moreover, cements other than those of the rapid curing variety have a rather long set time, one the order of one to thirty days, rendering such cements useless when an excavation must be backfilled in a matter of a few hours after the stabilizing composition is mixed with the soil. Other materials such as calcium chloride and calcium sulfate (gypsum) can also be employed.

However, of all the hydratable materials, lime is the most preferred because of its ready availability in all parts of the country and because it is relatively inexpensive. Furthermore, lime has been placed in the soil in the past and does not present any significant soil pollution problem or other problems when used within the limitations set forth below. It is to be understood that when the term "lime" is used herein, it is intended to refer to commercially available chemical lime in the form of quicklime. Quicklime is much preferred for use in the present invention because of its great affinity for water. It is also to be understood that commercially available quicklime varies in its content of calcium oxide from on the order of 93% to 98% calcium oxide, with the remainder being magnesium oxide and other impurities. Another significant advantage of quicklime over other hydratable materials is that quicklime, upon hydration, releases substantial energy in the form of heat. The heat of hydration actually vaporizes some of the water in the soil and thus reduces the absolute water content of the resulting soil mass. All of the examples and ranges hereinafter referring to lime are based on quicklime containing on the order of 93% or greater by weight calcium oxide. It is further to be understood that the percentages and ranges and proportions hereinafter given can be converted to a partially hydrated quicklime by changing the amounts of lime in proportion to the amount of calcium oxide actually present in the partially hydrated or hydrated materials.

Quicklime is available in several physical forms including lump, pebble, ground, pulverized and pelletized. Although any of these forms can be used, either pebble lime or pelletized quicklime is preferred. When the particle size of the lime is too large, such as lump lime, it does not present a large enough surface area to the soil to consume sufficient water by the hydration process in a relatively short time. On the other hand, if pulverized or ground lime is utilized, it is difficult to handle and, during mixing, is very dusty, and thus increases the laboror's exposure to the quicklime. When medium particle size lime, such as pelletized or pebble lime having a mean or average diameter on the order of one inch or less, is utilized, a sufficient amount of surface area is presented to the soil to consume adequate amounts of water by the hydration process in less than two hours. Moreover, all of the lime is not immediately hydrated, thus providing the ability to take up additional water over a long period of time. This capability allows the additive to continue working by taking up water after the backfill is placed in the excavation.

Figure 1:
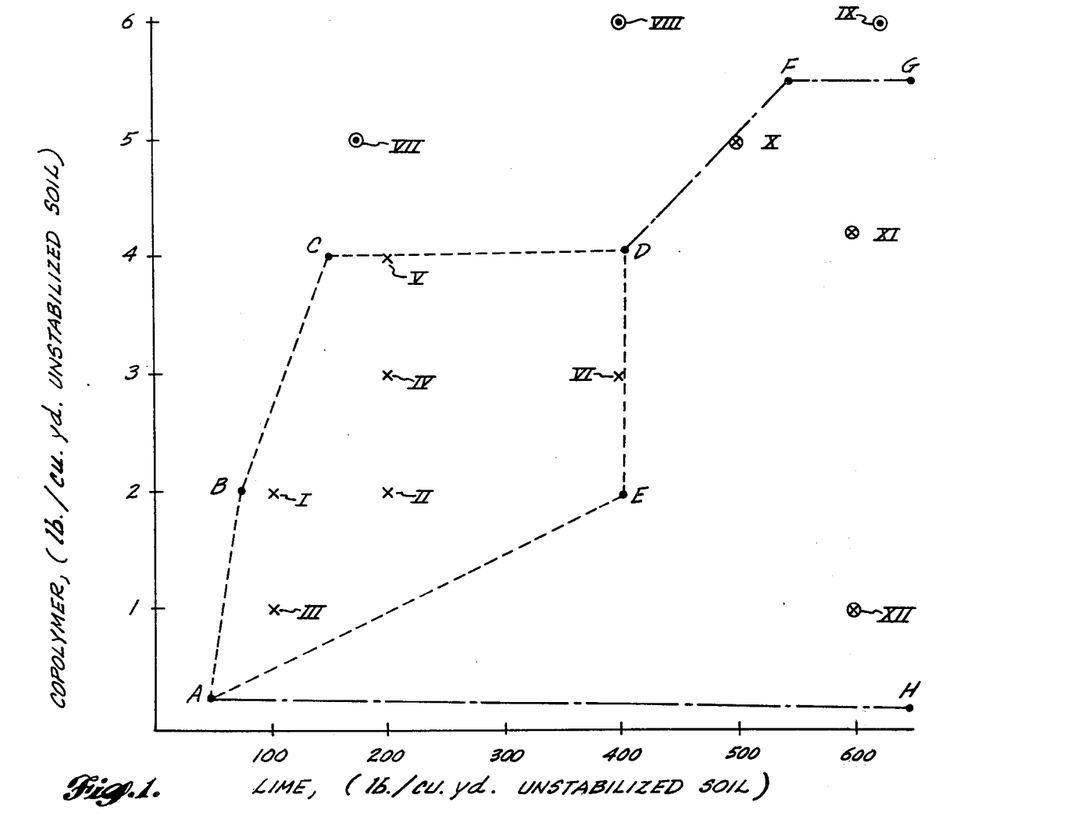
FIG. 1 is a graph showing the effective proportions of lime and graft copolymer per cubic yard of soil that will yield a relatively dry, compactable soil mass suitable for use as a backfill. Only those proportions falling within the polygon ABCDE are effective to yield such a compactable soil mass.

Although in the broadest sense, the invention has been set forth as combining the graft copolymer and the hydratable material with soil to produce a relatively dry, compactable soil mass, it has been found that there are critical limitations as to how much polymer and how much lime can be added to a given quantity of soil and yet produce the end result of a relatively dry, compactable soil mass that is easily handled and is relatively inexpensive. FIG. 1, a graph setting forth the bounds of the graft copolymer per cubic yard of unstabilized soil and the amount of lime in pounds per cubic yard of unstabilized soil, illustrates these critical limitations on amounts of graft copolymer and lime. The amounts of graft copolymer and lime that are operable within the purview of the present invention to produce a relatively dry, compactable soil mass are those values falling within the polygon ABCDE. The amounts of copolymer and lime falling within the polygon ABCDE will absorb sufficient water to yield the stabilized soil mass in less than 2 hours after admixture. Normally, sufficient water absorption will occur in on the order of 0.5 hour to 1.5 hours after admixture.

The upper limit on the amount of graft copolymer that can be added is represented by the line CD, which limit is about 4 pounds per cubic yard of unstabilized soil. The addition of polymer amounts in excess of about 4 pounds per cubic yard of unstabilized soil results in a partially or completely gelled soil mass. This result is attributable directly to the presence of too much polymer and stems from the ability of the polymer to absorb water in amounts many times its dry weight. (If the polymer and water are mixed by themselves, a gelled mass is formed.) Depending upon the degree of mixing, this same gel appears in the soil either as gelatinized lumps or as a homogeneous gel containing the soil and lime. When the gel is present, the soil mass is not compactable but has a certain amount of resiliency, which characteristic is undesirable in a backfill material. Although the line ABC is somewhat approximate, additive compositions falling to the left of the line ABC form a gelatinous mass that is not compactable because of the high ratio of polymer to lime.

The line DE in FIG. 1 represents the upper limit of lime that can be added to the unstabilized soil and yet result in a usable product. If more than about 400 pounds of lime are added per cubic yard of soil, the resulting soil mass may be at least partially compactable. However, the soil mass is very dusty and very difficult to handle. Moreover, quantities of quicklime in excess of 400 pounds per cubic yard of soil is toxic to the ecosystem of the back filled area and the surrounding region. Quantities of lime falling to the right of the line DE will severely inhibit the growth rate of surface plants such as grass, and will more likely than not kill the plant life in the soil. In addition, a laborer handling the material might be endangered from excessive amounts of lime dust in the air. Moreover, amounts of lime in excess of 400 pounds per cubic yard of soil will pollute the ground water, will cause corrosion of metallic members buried in the excavation, and will produce excessive amounts of heat of hydration that can be detrimental to plastic pipe and corrosion coatings on metallic pipe buried in the excavation. In addition the expense of excessive amounts of stabilizing agent is relatively high, and thus renders the invention economically noncompetitive with the alternative of hauling in new backfill.

The line AE represents the lower combined limit of copolymer and lime. The lower limit of copolymer and lime amounts to 0.25 pounds of copolymer per cubic yard of unstabilized soil and 50 pounds of lime per cubic yard of unstabilized soil (point A). This represents a minimum amount of the two components of the additive that can be utilized and still provide a relatively dry, stabilized, compactable soil mass. Point E represents the amount of copolymer that must be used relative to 400 pounds of lime per cubic yard of unstabilized soil, the upper limit of the amount of lime that is effective, which is 2 pounds of copolymer per cubic yard of unstabilized soil. It will be noticed that the line AE represents weight proportions of copolymer to lime of about 0.5:100 (or 1:200). If the ratio of copolymer to lime falls below 0.5:100, the resulting soil mass again becomes too dusty and/or does not absorb a sufficient amount of water to make the soil mass easy to handle. The soil mass resulting from proportions of copolymer and lime falling below line AE may be at least partially compactable but repetitive results with similar soils are not obtainable.

Thus, the range of compositions falling within the polygon ABCDE are critical to provide is less than about two hours a stabilized soil mass from which a sufficient amount of water has been absorbed to render the soil mass relatively dry and compactable, and thus usable as a backfill. It should be noted at this point that the phrase "relatively dry" is utilized to convey not that the soil mass is dry in the true physical sense but that it appears to be dry because water has been taken out of the soil per se by the hydration process due to the presence of the quicklime and by the capability of the graft copolymer to absorb water in amounts many times its weight. Thus, although a soil mass stabilized in accordance with the present invention appears to be relatively dry and it can be easily handled and is compactable, if an analysis were run for the amount of water present in the soil mass, it is near the optimum moisture for compactability. The compactability of soil is primarily dependent upon the type of soil and the water content of the soil. The optimum water content of soil to achieve maximum compactability will vary greatly among the different soils. Therefore, compactability is defined for purposes of the present invention as the ability to rapidly reduce the voids (i.e., increase the density) in a given soil. To achieve good compactability in accordance with the present invention, the water content is adjusted by the use of the stabilizing agent disclosed above. It should be noted, however, that the absolute water content of a soil stabilized in accordance with the present invention is higher than the optimum water content for compactability of a soil without the stabilizing composition, since some of the soil moisture is absorbed by the polymer and hydrated by the lime, thus binding it up to prevent it from interfering with compaction even though the water remains in the soil.

Figure 2:
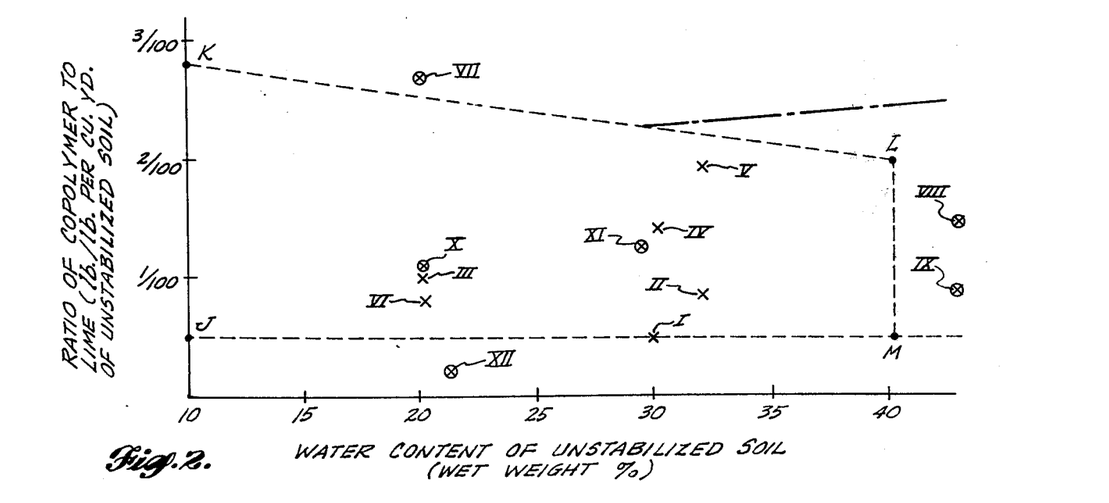
FIG. 2 is a graph illustrating the relative proportions of the graft copolymer to lime versus the water content of the soil. Only those proportions falling within the polygon JKLM are effective to yield a relatively dry, compactable soil mass suitable for use as a backfill.

Referring to FIG. 2, a critical relationship has also been found not only between the lower limit of polymer to lime as discussed above, but also with respect to the upper limit of polymer to lime. For example, when the water content of the soil is about 10 wet weight percent (i.e., the percent of water based upon the total amount of unstabilized soil and water present), a ratio of 3 pounds of polymer per 100 pounds of lime, represented at point K, will serve to form the relatively dry, stabilized soil mass. However, as the percentage of water increases, the proportion of copolymer to lime is preferably reduced so that when, for example, the water content of the unstabilized soil reaches about 40% by weight, the ratio of copolymer to soil is reduced to about 2:100, as represented by point L in FIG. 2. The lower limit of ratio of copolymer to lime of 0.5:100 is represented by the line JM and does not vary with the amount of water in the soil. The upper limit of the proportion of copolymer to lime present in the stabilized soil mass is represented by line KL. Above this line, too much polymer is present in the soil mass, resulting in a partially or fully gelatinized mass that is, as explained above, not compactable. Thus the proportion of copolymer to lime in the stabilizing composition must also fall within the bounds of the polygon JKLM depicted in FIG. 2. If the water content of the soil rises much above 40% by wet weight, the soil itself begins to flow and is not acceptable for use as a backfill in any event. If sufficient amounts of polymer and lime are added to stabilize such soil, the amounts of lime required would be prohibitive, if at all effective to dry out the soil. Moreover, the polymer would tend to absorb so much water from the soil that it would be very difficult to achieve a relatively dry and compactable soil, as the mass tends to gelatinize when proportions lying above the line KL are employed.

It must be realized that the quantities and proportions defined within the bounds of the polygons ABCDE in FIG. 1 and JKLM in FIG. 2 represent very close approximations to the actual amounts and proportions that provide the critical limitations beyond which a relatively dry, compactable soil mass is not achieved. The values defined by the bounds of the polygons will be affected by the actual percentage of calcium oxide in the quicklime utilized by the particular type of hydratable material utilized. If a hydratable material other than lime is employed, the values defined within the perimeters of the polygons must be adjusted so as to provide an equivalent amount of another hydratable material without obtaining the undesirable results obtained with quicklime outside the polygon boundaries. It must be emphasized that, for example, while an upper limit of about 4 pounds of polymer per cubic yard of soil is defined by the polygon ABCDE of FIG. 1, it is highly probably that for a given water content in a given soil, a slightly greater amount of polymer, perhaps up to 4.5 pounds per cubic yard, will yield acceptable results. Quantities of polymer any greater than that amount will, however, invariably yield a soil mass that is unacceptable for use as a backfill. Likewise, for example, quantities of lime slightly in excess of 400 pounds per cubic yard of unstabilized soil will, under the appropriate conditions, yield a soil mass acceptable for use as a backfill. Thus by necessity, because of the great variety of natural soil conditions that are encountered, the limits of the polygon are not absolute, but closely approximated.

Although the soil additive of the present invention comprising the graft copolymer and the hydratable material can be mixed with a soil after it is replaced in an excavation, it is preferred that the additive to admixed with the soil in proportionate quantities as the soil is being removed from the excavation. This preferance is based upon the experience that better mixing is obtained if the additive is admixed in small quantities. After the additive is mixed with the unstabilized soil, it is most desirable to allow the resulting soil mass to remain outside of the excavation for a period of time generally not exceeding two hours. Allowing the stabilized soil mass to remain outside the excavation has a two-fold advantage. First, the heat of hydration produced is sufficiently significant to evaporate some of the water present in the soil mass, thus reducing its absolute water content. In addition, if the excavation from which the unstabilized soil is removed exposes a heat sensitive element, such as an electrical wire surrounded by heat sensitive insulation, a plastic pipe, or a metal pipe containing a heat sensitive anticorrosion coating, the heat of hydration will necessarily be dissipated to the atmosphere before the stabilized soil composition comes into contact with the heat sensitive materal.

The following Examples are intended to be illustrative of how the method and additive composition of the present invention can be effectively used to produce a relatively dry, compactable soil mass for use in refilling an excavation with the wet soil removed from the excavation. The Examples are not intended to delimit in any way the scope of the invention as otherwise disclosed herein. The compositions of each of the following Examples I–XII are plotted on the graphs of FIGS. 1 and 2 and labeled with the corresponding example numbers.

EXAMPLE 1

An excavation was made in clay-slit soil having a moisture content of 30 percent by wet weight, based on the total weight of soil and water present. As the soil was being removed from the excavation, a graft copolymer produced by the process described in U.S. Pat. No. 3,661,815 (commercially available from Grain Processing Corporation, Muscatine, Iowa under the trademark "Polymer 35-A-100") and lime (chemical quicklime containing about 94% by weight calcium oxide, based on the total weight of the mixture) was thoroughly admixed with the soil. The resulting admixture contained 2 pounds of the copolymer per cubic yard of unstabilized soil and 100 pounds of lime per cubic yard of unstabilized soil. The admixture was allowed to stand outside the excavation for a period of ¾ hours. The resulting stabilized soil mass was relatively dry to the touch and appearance, was crumbly, but not dusty, and compacted very well to form an excellent backfill.

EXAMPLE II

The results of Example 1 were repeated on a soil containing 32 wet weight percent of water by following the procedure of Example 1 using 2 pounds of copolymer and 200 pounds of lime per cubic yard of unstabilized soil were admixed with the soil.

EXAMPLE III

The results of Example I were repeated on a soil containing 20 wet weight percent of water by following the procedure of Example 1 using 1 pound of copolymer and 100 pounds of lime per cubic yard of unstabilized soil.

EXAMPLE IV

The results of Example I were repeated on a soil containing 30 wet weight percent of water by folloing the procedures of Example 1 using 3 pounds of copolymer and 200 pounds of lime per cubic yard of unstabilized soil.

EXAMPLE V

The results of Example 1 were repeated on a soil containing 32 wet weight percent of water by following the procedure of Example 1 using 4 pounds of copolymer and 200 pounds of lime per cubic yard of unstabilized soil.

EXAMPLE VI

The results of Example 1 were repeated on a soil containing 20 wet weight percent of water by following the procedure of Example 1 using 3 pounds of copolymer and 400 pounds of lime per cubic yard of unstabilized soil.

EXAMPLE VII

The procedure of Example 1 was repeated on a soil containing 20 wet weight percent of water using 5 pounds of copolymer and 175 pounds of lime per cubic yard of unstabilized soil. The resulting admixture was partially gelled and was not compactable. The resulting soil mass was thus unacceptable for use as a backfill.

EXAMPLE VIII

The procedure of Example 1 was repeated on a soil containing 43 wet weight percent of water using 6 pounds of copolymer and 400 pounds of lime per cubic yard of unstabilized soil. The resulting admixture was almost completely gelled and was not compactable. The resulting soil mass was therefore unacceptable for use as a backfill.

EXAMPLE IX

The procedure of Example 1 was repeated on a soil containing 43 wet weight percent of water using 6 pounds of copolymer and 600 pounds of lime per cubic yard of unstabilized soil. The resulting admixture was partially gelled and was not compactable. The resulting soil mass was thus unacceptable for use as a backfill.

EXAMPLE X

The procedure of Example 1 was repeated on a soil containing 20 wet weight percent of water using 5 pounds of copolymer and 500 pounds of lime per cubic yard of unstabilized soil. The resulting admixture was compactable to a very limited degree, but was unacceptable as a backfill because it was very dusty (thus leading to difficult and hazardous handling), created a groundwater pollution problem, and was corrosive to metal pipe in the excavation because of its high alkalinity.

EXAMPLE XI

The procedure of Example 1 was repeated on a soil containing 29 wet weight percent of water using 4.25 pounds of copolymer and 600 pounds of lime per cubic yard of unstabilized soil. The resulting mass was similar to that obtained in Example X and thus unacceptable as a backfill.

EXAMPLE XII

The procedure of Example 1 was repeated on a soil containing 22 wet weight percent of water using 1 pound of copolymer and 600 pounds of lime per cubic yard of unstabilized soil. The resulting admixture was similar to that obtained in Example X and was thereore unacceptable for use as a backfill material.

As can be seen from the foregoing Examples and the preceding description, the soil additive of the present invention has a variety of uses in addition to use only for drying out wet, muddy soils removed from an excavation. The additive composition and process of the present invention can be employed in construction projects, for example, to dry out subgrades for roads and buildings, to dry soils when constructing embankments and fills, or to develop marginal soil areas such as swampy areas. In addition, the additive of the present invention can be employed to remove the wet, muddy composition normally encountered at the bottom of a casing in preparation for the pouring of concrete. The composition and method of the present invention can also be employed to dry out sewage sludges and to reclaim waste industrial sludges and the like. There are many other uses not enumerated above to which the methods and compositions of the present invention can be put. However, the foregoing disclosure will enable one of ordinary skill to utilize the invention for various end uses without departing from the general concepts disclosed herein.

A second aspect of the present invention is the discovery of a use for the aforementioned graft copolymers, preferably in conjunction with other compositions, as a backfill material for surrounding an electrically conductive grounding member. It has been found that the copolymer, when combined with water, will serve as an effective electrolyte, forming a conductive path between an electrically conductive grounding member and the earth. Examples of such grounding members include the grounding member or electrode for grounding systems utilized in conjunction with high voltage power lines, antennae and the like, anodes for cathodic protection systems, and other electrodes that serve to make an electrical connection with the earth.

The following description will be presented in conjunction with the use of the graft copolymer as a backfill around an anode for a cathodic protection system. As background, magnesium and zinc anodes are usually positioned in the soil and connected by an electrical conductor to a metal member that is to be protected against corrosion by the cathodic protection system. Electrons flow from the anode to the metal member to render it cathodic, resulting in protection of the metal member against electrolytic corrosion. In order for such a cathodic protection system to work effectively, the anode must make a good electrical contact with the earth, that is, the soil surrounding the anode must be relatively free to conduct electrons to the anode. To increase the effectiveness of anodes, it has been the practice to surround the anodes with a special backfill comprising gypsum, bentonite and sodium sulfate. This backfill is normally required to insure a homogenous, moist, relatively low resistivity environment that increases the efficiency of the anode by providing it with a larger effective surface area and that extend the anode life.

In accordance with the second aspect of the present invention, it has been discovered that the aforementioned graft copolymers of starch and polyacrylonitrile and starch and polymethacrylonitrile are effective, when combined with water, to function as a backfill for anodes and other grounding members. Unexpectedly, however, the graft copolymer, when employed as a backfill for anodes, has the capability of functioning as a good electrolyte, causing an increase in curent flow and an increase in cathode-to-soil potential. The resulting increase in current flow, which has been measured up to 2 times that of systems using conventional anode backfill, allows the use of fewer anodes than in conventional systems while achieving a cathode-to-ground potential (normally on the order of $-0.85$ volts) of up to 4 times that obtained with conventional systems. It has been found that the number of anodes required for a given cathodic protection system can be reduced on the order of from 50 % to 75% when the grouping member backfill material of the present invention is employed.

Although the polymer is effective by itself to function as a backfill when combined with water for electrically conductive grounding members, the life of the polymer in the ground is not very long as ground water flow tends to leach the polymer and remove it from the region adjacent the anode. When the graft copolymer is combined with a material that is substantially impervious to water, such as certain types of soil, for example, clay or other related materials such as a bentonite clay, the polymer life adjacent the anode is significantly increased. It is believed that the bentonite, for example, acts as a coating or a shield to prevent ground water from carrying polymer away from the region of the grounding member. The bentonite functions as a binder for the polymer, thus preventing the polymer from being leached away from the region of the anode or other grounding member. Other suitable materials that will not adversely affect the electrical conductivity of the backfill include other crystalline minerals similar to bentonite clay, for example kaolin and montmorillonite, whose surface activity is such that the materials develop cohesion and plasticity in the backfill material.

The preferred manner of using the grounding member backfill composition in accordance with the present invention is to excavate a cavity or hole in the ground that is larger than the metallic portion of a conventional anode or other grounding member, thereafter to place the grounding member in the cavity, and to fill the space between the grounding member and the earth with the backfill material. Normally, the range of backfill material can be supplied to the field in a 1:1 mix (by weight), although proportions in the range of from 1:1/2 by weight of bentonite to copolymer to 10:1 by weight bentonite to copolymer are acceptable for use in accordance with the present invention. Prior to placement in the cavity, the bentonite copolymer mixture is combined with water in the field to form a gelatinous mass, and is then poured into the cavity or hole in which the anode or other grounding member has been placed so as to surround the grounding member with the backfill material. Water can be combined with the polymer/bentonite mixture in amounts ranging from about 20:1 by weight to about 40:1 by weight or more, water to mixture to provide a pourable backfill composition. Greater amounts of water can also be employed with effective results. The amounts of grounding member backfill used in accordance with the present invention are similar to the prior art. It is preferred that the cavity into which the grounding member is inserted be made sufficiently large so that the grounding member fills about 80% of the volume of the hole and the backfill fills the remaining 20% of the volume.

As with the stabilizing composition, the graft copolymer can be any of those enumerated above as disclosed in the patent assigned to Grain Processing Corporation and the several patents assigned to the Secretary of Agriculture. It is preferred, however, that the graft copolymers disclosed in U.S. Pat. No. 3,661,815 to Grain Processing Corporation be employed as it is less sensitive to the ability of mineral salts to cause the polymer to release absorbed water.

The following Examples are intended to be illustrative of the second aspect of the present invention relating to the grounding member backfill material. The Examples are not intended to be in any way delimitative of the broad concepts disclosed herein.

EXAMPLE XIII

A section of iron pipe having a diameter of 2 inches was buried in soil having a resistivity of about 24,000 ohms per cubic centimeter. Two vertical holes about 6 inches in diameter and about 18 inches deep were dug adjacent the pipe with the top of the holes just below the elevation of the pipe. Graft copolymer backfill was prepared in accordance with the present invention by mixing 1 pound of polymer ("Polymer 35-A-100") and ½ pound of bentonite clay with about 40 pounds of water in the hole. The copolymer backfill formed a gelatinous mass. A 17 pound bare magnesium anode (without conventional backfill) was then placed in the hole so that the copolymer backfill completely surrounded the anode. The lead between the anode and the pipe were brought to the surface of the ground. The second hole was filled with water. A 17 pound magnesium anode encased in a conventional backfill of gypsum/bentonite/sodium sulfate was installed and the leads from the pipe to the second anode surrounded by conventional backfill were brought to the surface of the ground. Both holes were then covered with native soil.

The current output from both of the anodes was then measured. The immediate current output from the anode surrounded by the graft copolymer backfill was 6.0 milliamps while the current output from the anode surrounded by the conventional backfill was 3.3 milliamps. The pipe-to-soil potential for the system employing the copolymer backfill was $-1.1$ volts while the pipe-to-soil potential for the system employing the conventional backfill was $-0.9$ volts. After seven months, the current output for both anodes stabilized near 6 milliamps, but the pipe-to-soil potential for the system employing the copolymer backfill was twice that for the system employing the conventional backfill.

EXAMPLE XIV

The procedure of Example XIII was repeated except the soil was sandy and rocky and had a resistivity of 40,000 to 50,000 ohms per cubic centimeter and the copolymer backfill was prepared by mixing 1 pound of "Polymer 35-A-100" with 3 pounds of bentonite and 40 pounds of water. The immediate current output from the system employing the copolymer backfill was 2 milliamps compared to 1 milliamp for the system employing the conventional backfill. The pipe-to-soil potential for the system employing the copolymer backfill was initially about 20% greater than the pipe-to-soil potential for the system employing the conventional backfill. After three months, the system employing the copolymer backfill had twice the current output and four times the pipe-to-soil potential as the system employing the conventional backfill.

EXAMPLE XV

The procedure of Example XIII was repeated except the soil was very sandy and had a resistivity of 60,000 to 70,000 ohms per cubic centimeter and the copolymer backfill was prepared by mixing 1 pound of "Polymer 35-A-100" with 40 pounds of water (no clay was utilized). The initial current output of the system employing the copolymer backfill was on the order of 1 to 2 milliamps while the current output from the system employing the conventional backfill was 0.2 milliamps. After several months, however, the copolymer backfill because less viscous, but had not leached from the region of the backfill. It is believed, however, that with time the polymer will leach from the region surrounding the anode if there is sufficient ground water flow.

EXAMPLE XVI

The procedure of Example XV was repeated except only bentonite clay was substituted for the copolymer. The bentonite was extremely difficult to mix with the water to obtain a continuous and homogenous backfill around the anode. The bentonite also had a tendency by itself to surface dry and crack, causing air gaps between the soil and the anode that greatly reduced its ability to function as an electrolyte. The initial current output and the pipe-to-soil potential of the system employing only bentonite backfill was only about 25% of that of the system employing the graft copolymer. With time the percentage efficiency of the bentonite system becomes even less.

Use of the graft copolymer as an additive around grounding members, alone or in combination with other materials has several benefits over prior backfill compositions utilized for the same purpose. The grounding member backfill material of the present invention provides an increased current flow and increased cathode to soil potential, provides better corrosion attack over the entire anode, provides excellent contact between the anode surfaces and continuously holds moisture around the anode. In addition, the present invention allows the use of fewer anodes for a given protection system. Moreover, the backfill of the present invention provides immediate electrical output with no soaking or saturation period required. Thus the present invention is far superior to prior art grounding member backfill materials and yields results that are not expected by one of ordinary skill in the art.

The embodiments of the invention in which an exclusive property or privilege is claimed are defined as follows:

1. A method for stabilizing water-containing soil to form a relatively dry, compactable soil mass comprising the steps of:
    combining an alkali metal salt of a starch-polyacrylonitrile or a starch-polymethacrylonitrile graft copolymer and a hydratable material with water-containing soil, said graft copolymer and said hydratable material being combined with said soil in an amount effective to remove water from said soil by absorption of at least a portion of said water in said soil by said graft copolymer and by at least partially hydrating said hydratable material and effective to form said relatively dry, compactable soil mass.

2. The method of claim 1 wherein said hydratable material comprises lime.

3. The method of claim 1 wherein said graft copolymer is produced by saponifying a starch-polyacrylonitrile graft copolymer wherein the molar ratio of acrylonitrile to starch is at least 2:1 or a starch-polymethacrylonitrile graft copolymer wherein the molar ratio of methacrylonitrile to starch is at least 2:1 with an aqueous methanolic or aqueous ethanolic solution of an alkali base selected from the group consisting of sodium hydroxide, lithium hydroxide or potassium hydroxide.

4. The method of claim 1 wherein said hydratable material is partially hydrated.

5. The method of claim 1 wherein said graft copolymer is present in an amount less than about four pounds per cubic yard of soil and wherein said lime is present in an amount less than about four hundred pounds per cubic yard of soil.

6. The method of claim 5 wherein said graft copolymer is present in an amount greater than 0.25 pounds per cubic yard of soil and wherein said lime is present in an amount greater than about 50 pounds per cubic yard of soil.

7. The method of claim 6 wherein the proportion of said graft copolymer to said lime is in the range of from about 0.5:100 to about 3:100.

8. The method of claim 7 wherein said lime is in pelletized or pebble form.

9. The method of claim 1 wherein said graft copolymer is produced by saponifying a gelatinized starch-polyacrylonitrile graft copolymer in an aqueous solution.

10. The method of claim 7 wherein said soil contains less than about forty weight percent of water based upon the wet weight of said soil.

11. The method of claim 10 wherein the proportion of said graft copolymer to said lime is less than about 3:100 for soil containing about ten weight percent of water to less than about 2:100 for soil containing about forty weight percent of water.

12. A method for stabilizing water-containing soil comprising the steps of:
combining an alkali metal salt of a starch-polyacrylonitrile or a starch-polymethacrylonitrile graft copolymer and lime with water-containing soil, the proportion of said copolymer to said lime being less than about 3:100 for soil containing about ten weight percent of water to less than about 2:100 for soil containing about forty weight percent of water, the proportion of said copolymer to said lime being greater than about 0.5:100, the proportions of copolymer and lime combined with said soil being effective to produce a compactable, relatively dry soil mass suitable for a load-supporting soil fill material.

13. The method of claim 12 wherein said soil contains up to about forty weight percent of water, said weight percent being based on the wet weight of said soil.

14. The method of claim 13 wherein said copolymer is present in an amount up to about four pounds per cubic yard of said soil and said lime is present in an amount up to about four hundred pounds per cubic yard of said soil.

15. The method of claim 14 wherein the amount of said lime present is greater than about fifty pounds per cubic yard of said soil and said copolymer is present in an amount greater than about 0.25 pounds per cubic yard of said soil.

16. The method of claim 15 wherein said copolymer and said lime are combined with said soil by the steps of:
removing said soil from the earth to form an excavation,
mixing said copolymer and said lime with said soil to form a soil/lime/copolymer composition,
allowing said composition to remain outside said excavation for a period less than about two hours, and
thereafter placing said composition in said excavation to form a stabilized, relatively dry, compactable soil fill for said excavation.

17. The method of claim 15 wherein the amount of said lime and said copolymer present per cubic yard of said soil falls within the bounds of polygon ABCDE of FIG. 1 and wherein the ratio of said lime and copolymer relative to the amount of water in said soil falls within the bounds of polygon JKLM of FIG. 2.

18. The method of claim 15 wherein said graft copolymer is produced by saponifying a starch-polyacrylonitrile graft copolymer wherein the molar ratio of acrylonitrile to starch is at least 2:1 or a starch-polymethacrylonitrile graft copolymer wherein the molar ratio of methacrylonitrile to starch is at least 2:1 with an aqueous methanolic or aqueous ethanolic solution of an alkali base selected from the group consisting of sodium hydroxide, lithium hydroxide or potassium hydroxide.

19. The method of claim 15 wherein said graft copolymer is produced by saponifying a gelatinized starch-polyacrylonitrile graft copolymer or a gelatinized starch-polymethacrylonitrile graft copolymer in an aqueous solution.

20. The method of claim 15 wherein said lime is present in granular or pebble form.

21. A method for backfilling around an electrically conductive grounding member comprising the steps of:
forming a cavity in the ground larger than said grounding member, placing said grounding member in said cavity,
filling the space between the ground and said grounding member with a backfill material comprising an alkali metal salt of a starch-polyacrylonitrile graft copolymer or a starch-polymethacrylonitrile graft copolymer and water.

22. The method of claim 21 wherein said grounding member comprises the anode of a cathodic protection system.

23. The method of claim 21 wherein said backfill material comprises a mixture of said graft copolymer and a composition that retards ground water flow through said backfill material.

24. The method of claim 23 wherein said composition comprises soil.

25. The method of claim 23 wherein said composition comprises bentonite.

26. The method of claim 25 wherein said bentonite and said graft copolymer are present in said backfill material in approximately equal amounts.

27. The method of claim 26 wherein the weight ratio of bentonite to copolymer ranges from about 1:1/2 to about 10:1.

28. A backfill material for surrounding an electrically conductive grounding member comprising a mixture of composition that retards water flow through said material and a starch-polyacrylonitrile graft copolymer or a starch-polymethacrylonitrile graft copolymer.

29. The material of claim 28 wherein said composition that retards water flow comprises bentonite.

30. The material of claim 28 wherein said mixture comprises approximately equal proportions of bentonite and said graft copolymer.

31. A backfill material for surrounding the anode of a cathodic protection system comprising a mixture of a composition that retards water flow through said composition and a starch-polyacrylonitrile graft copolymer or a starch-polymethacrylonitrile graft copolymer.

32. The material of claim 31 wherein said composition that retards water flow comprises bentonite.

33. The material of claim 32 wherein said mixture comprises approximately equal proportions of bentonite and said graft copolymer.

34. A soil stabilizing material comprising: an alkali metal salt of a starch-polyacrylonitrile or a starch-polymethacrylonitrile graft copolymer, and a hydratable material.

35. The material of claim 34 wherein the hydratable material is quicklime.

36. The material of claim 35 wherein said quicklime is present in weight proportions relative to said graft copolymer of from 100:1 to 100:3, respectively.

* * * * *